United States Patent
Duan et al.

(10) Patent No.: US 10,767,729 B2
(45) Date of Patent: Sep. 8, 2020

(54) CHAIN COMPOSED OF DIFFERENT PITCH LINKS WITH REPEATED SEQUENCE

(71) Applicant: GM GLOBAL TECHNOLOGY OPERATIONS LLC, Detroit, MI (US)

(72) Inventors: Chengwu Duan, Shanghai (CN); Chi-kuan Kao, Troy, MI (US); Jian Yao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 35 days.

(21) Appl. No.: 15/750,696

(22) PCT Filed: Sep. 16, 2015

(86) PCT No.: PCT/CN2015/089740
§ 371 (c)(1),
(2) Date: Feb. 6, 2018

(87) PCT Pub. No.: WO2017/045156
PCT Pub. Date: Mar. 23, 2017

(65) Prior Publication Data
US 2018/0238420 A1    Aug. 23, 2018

(51) Int. Cl.
*F16G 5/18* (2006.01)
*F16H 9/24* (2006.01)
(Continued)

(52) U.S. Cl.
CPC .............. *F16G 5/18* (2013.01); *F16G 1/28* (2013.01); *F16G 5/20* (2013.01); *F16G 13/08* (2013.01);
(Continued)

(58) Field of Classification Search
CPC ... F16G 5/18; F16G 5/20; F16G 13/04; F16G 13/06; F16G 13/08; F16G 1/28;
(Continued)

(56) References Cited

U.S. PATENT DOCUMENTS 4,367,067 A * 1/1983 Chao .................. F16G 5/20
474/154
4,705,492 A * 11/1987 Hattori .................. F16H 55/56
474/49

(Continued)

FOREIGN PATENT DOCUMENTS

| CN | 101278141 A | 10/2008 |
|---|---|---|
| JP | 2006097844 A | 4/2006 |
| JP | 2015045344 A | 3/2015 |

OTHER PUBLICATIONS

JP2006097844(A)_Translation; Power Transmission Chain and Power Transmission Device Using It; Kamamoto et al; Published: Apr. 13, 2006; Espacenet (Year: 2006).*

(Continued)

*Primary Examiner* — Michael R Mansen
*Assistant Examiner* — Raveen J Dias
(74) *Attorney, Agent, or Firm* — Lorenz & Kopf, LLP

(57) ABSTRACT

A number of variations may include a product that may include a linking member that may have links arranged in rows that have multiple pitch lengths. Each of the rows may have at least one link. Each of the multiple pitch lengths may be a discrete length that may be different from others of the multiple pitch lengths. The rows may be arranged along the linking member in a repeating sequence of the multiple pitch lengths.

16 Claims, 2 Drawing Sheets

(51) Int. Cl.
    *F16G 13/08*     (2006.01)
    *F16H 57/00*     (2012.01)
    *F16G 5/20*     (2006.01)
    *F16G 1/28*     (2006.01)
    *F16G 13/06*     (2006.01)
    *F16H 55/56*     (2006.01)
    *F16H 55/49*     (2006.01)
    *F16G 13/04*     (2006.01)
    *F16H 55/52*     (2006.01)

(52) U.S. Cl.
    CPC ............ *F16H 9/24* (2013.01); *F16G 13/04* (2013.01); *F16G 13/06* (2013.01); *F16H 55/49* (2013.01); *F16H 55/52* (2013.01); *F16H 55/56* (2013.01); *F16H 57/0006* (2013.01)

(58) Field of Classification Search
    CPC . F16H 9/24; F16H 55/49; F16H 55/52; F16H 55/54; F16H 55/56
    See application file for complete search history.

(56) References Cited

U.S. PATENT DOCUMENTS

| | | | | |
|---|---|---|---|---|
| 4,832,668 A * | 5/1989 | Ledvina | .................. | F16G 13/04 474/155 |
| 4,943,266 A * | 7/1990 | Mott | .................. | F16G 5/18 474/201 |
| 5,397,280 A * | 3/1995 | Skurka | .................. | F01L 1/02 474/156 |
| 5,427,583 A * | 6/1995 | Wolf | .................. | F16G 5/18 474/206 |
| 5,453,059 A * | 9/1995 | Avramidis | .................. | F01L 1/02 474/212 |
| 5,464,374 A * | 11/1995 | Mott | .................. | F16G 5/18 474/224 |
| 6,186,920 B1 * | 2/2001 | Reber | .................. | F16G 13/04 474/157 |
| 6,287,229 B2 * | 9/2001 | Reber | .................. | F16G 13/04 474/157 |
| 6,325,735 B1 * | 12/2001 | Kanehira | .................. | F16G 13/04 474/206 |
| 6,379,275 B1 * | 4/2002 | Serkh | .................. | F16G 5/16 474/100 |
| 6,432,011 B1 * | 8/2002 | Kanehira | .................. | F16G 13/04 474/213 |
| 6,478,704 B1 * | 11/2002 | Greiter | .................. | F16G 5/18 474/215 |
| 7,837,583 B2 * | 11/2010 | Tohara | .................. | F16G 13/08 474/201 |
| 8,012,054 B2 * | 9/2011 | Morimoto | .................. | F16G 13/04 474/215 |
| 8,393,984 B2 * | 3/2013 | Naude | .................. | F16H 9/14 474/49 |
| 8,986,145 B2 * | 3/2015 | Kamamoto | .................. | F16H 9/24 474/245 |
| 2005/0187057 A1 * | 8/2005 | Lou | .................. | F16G 5/18 474/245 |
| 2005/0282674 A1 * | 12/2005 | Teubert | .................. | F16G 5/18 474/229 |
| 2007/0072722 A1 * | 3/2007 | Kamamoto | .................. | F16G 5/18 474/245 |
| 2007/0087881 A1 * | 4/2007 | Baumann | .................. | F16G 5/18 474/215 |
| 2007/0179003 A1 * | 8/2007 | Vornehm | .................. | F16G 5/18 474/215 |
| 2007/0197332 A1 * | 8/2007 | Junig | .................. | F16G 5/18 474/215 |
| 2008/0176693 A1 * | 7/2008 | Teubert | .................. | F16G 5/18 474/229 |
| 2008/0207368 A1 * | 8/2008 | Junig | .................. | F16G 5/18 474/140 |
| 2010/0069188 A1 * | 3/2010 | Adachi | .................. | B62D 55/096 474/213 |
| 2012/0167540 A1 | 7/2012 | Miura et al. | | |
| 2013/0079183 A1 * | 3/2013 | Miura | .................. | F16G 5/18 474/8 |
| 2013/0109515 A1 | 5/2013 | Nakazawa et al. | | |
| 2015/0285338 A1 * | 10/2015 | Penner | .................. | F16G 13/08 474/206 |

OTHER PUBLICATIONS

SIPO of The P.R. China, International Search Report and Written Opinion issue in International Application No. PCT/CN2015/089740, dated May 5, 2016.

* cited by examiner

CHAIN COMPOSED OF DIFFERENT PITCH LINKS WITH REPEATED SEQUENCE

CROSS-REFERENCE TO RELATED APPLICATION

This application is a U.S. National-Stage entry under 35 U.S.C. § 371 based on International Application No. PCT/CN2015/089740, filed Sep. 16, 2015, which was published under PCT Article 21(2) and is hereby incorporated in its entirety by reference.

TECHNICAL FIELD

The field to which the disclosure generally relates includes chains and more particularly, includes chains for continuously variable transmissions.

BACKGROUND

In the transmission of rotational power between a driving and a driven component, a linking member such as a belt or chain may be used. The linking member may be constructed in an endless assembly of constituents that may form a loop or ring that may be engaged around the driving and driven components. The driving and driven components may be configured to rotate and may be pulleys, sprockets, or other structures that are engaged by the linking member to rotate together. Engagement with the linking member enables the transmission of torque from the driving to the driven component.

SUMMARY OF ILLUSTRATIVE VARIATIONS

A number of variations may include a product that may include a linking member that may have links arranged in rows that have multiple pitch lengths. Each of the rows may have at least one link. Each of the multiple pitch lengths may be a discrete length that may be different from others of the multiple pitch lengths. The rows may be arranged along the linking member in a repeating sequence of the multiple pitch lengths.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
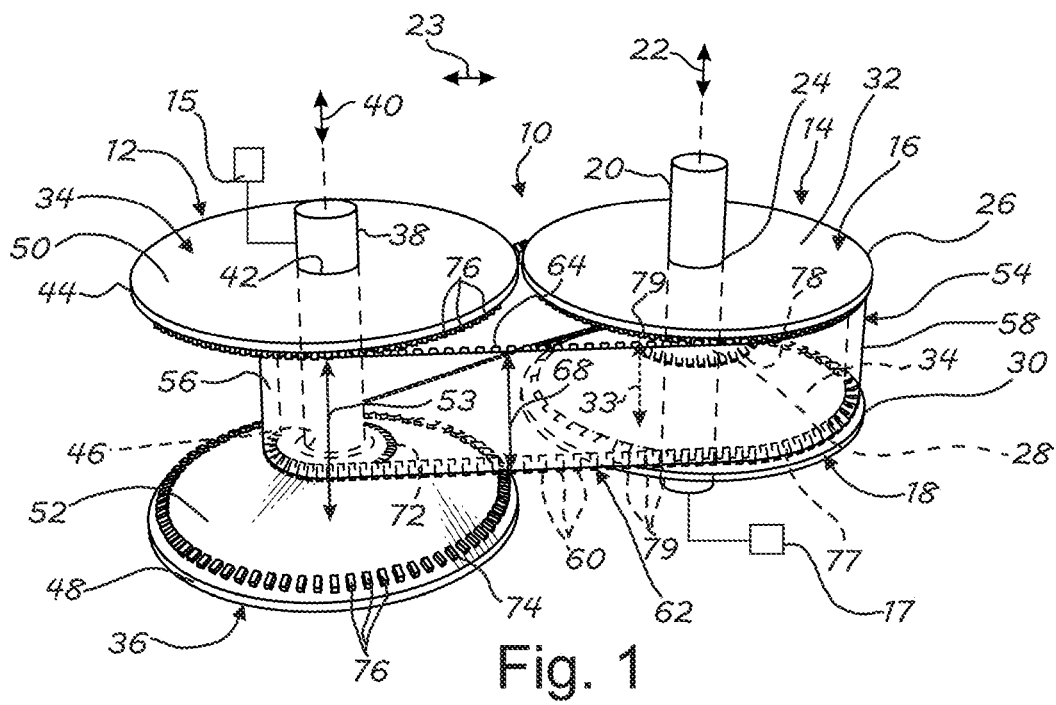
FIG. 1 illustrates an isometric schematic view of product according to a number of variations.

A number of variations may involve a product that may be, or may include, a linking member that may be comprised of different pitch links, which may be arranged in a repeated sequence. The product may be a chain or another linking member. The product may be used in any number of applications. The applications may involve vehicles, off-road equipment, material conveyance, aircraft, watercraft, industrial machines, power transfer, synchronization, or other applications. In a number of variations as illustrated in FIG. 1, a device 10, which may be the torque transfer unit of a continuously variable transmission, may include a driving pulley assembly 12 and a driven pulley assembly 14. The driving pulley assembly 12 may be operatively connected with an engine 15 to provide driving torque. The driven pulley assembly 14 may be operatively connected with at least one road wheel 17 for propelling an associated vehicle.

In a number of variations the driven pulley assembly 14 may include a first sheave 16 and an opposed second sheave 18, each mounted to rotate with or about a pulley axle 20. At least one of the first sheave 16 and the second sheave 18 is moveable on the pulley axle 20 in an axial direction 22 to vary the axial distance between the first and second sheaves 16, 18. The first sheave 16 may have an inner perimeter 24 through which the pulley axle 20 extends and may have an outer perimeter 26 so that the first sheave 16 extends in the radial direction 23, which may be perpendicular to the axial direction 22, between the inner perimeter 24 and the outer perimeter 26. The second sheave 18 may have an inner perimeter 28 through which the pulley axle 20 extends and an outer perimeter 30 so that the second sheave 18 extends in the radial direction 23 between the inner perimeter 28 and the outer perimeter 30. The first sheave 16 may have an outer surface 32, that may face away from the second sheave 18, and that may be substantially flat and may extend in the radial direction 23 between the inner perimeter 24 and the outer perimeter 26. The second sheave 18 may have an inner surface 34 that may be conical, or conical-like, in shape and that may extend at an oblique angle between the inner perimeter 28 and the outer perimeter 30 so that the inner perimeter 28 is closer to the first sheave 16 than is the outer perimeter 30. The first sheave 16 may have an inner surface facing the second sheave 18 that is shaped like, or similar to, the inner surface 34. The second sheave 18 may have an outer surface facing away from the first sheave 16 that is shaped like, or similar to, the outer surface 32. The first sheave 16 may be moveable in the axial direction 22 so that the distance 33 between the respective inner surfaces of the first and second sheaves 16, 18 is variable.

In a number of variations the driving pulley assembly 12 may include a first sheave 34 and an opposed second sheave 36, each mounted to rotate with or about a pulley axle 38. At least one of the first sheave 34 and the second sheave 36 is moveable on the pulley axle 38 in an axial direction 40 to vary the axial distance between the first and second sheaves 34, 36. The first sheave 34 may have an inner perimeter 42 through which the pulley axle 38 extends and an outer perimeter 44 so that the first sheave 34 extends in the radial direction 23, which may be perpendicular to the axial direction 40, between the inner perimeter 42 and the outer perimeter 44. The second sheave 36 may have an inner perimeter 46 through which the pulley axle 38 extends and an outer perimeter 48 so that the second sheave 36 extends in the radial direction 23 between the inner perimeter 46 and the outer perimeter 48. The first sheave 34 may have an outer surface 50 that may face away from the second sheave 36 and that may be substantially flat and may extend in the radial direction 23 between the inner perimeter 42 and the outer perimeter 44. The second sheave 36 may have an inner surface 52 that may be conical, or conical-like, in shape and that may extend at an oblique angle between the inner perimeter 46 and the outer perimeter 48 so that the inner perimeter 46 is closer to the first sheave 34 than is the outer perimeter 48. The first sheave 34 may have an inner surface facing the second sheave 36 that is shaped like, or similar to, the inner surface 52. The second sheave 36 may have an outer surface facing away from the first sheave 34 that is shaped like, or similar to, the outer surface 50. The first sheave 34 may be moveable in the axial direction 40 so that the distance 53 between the respective inner surfaces of the first and second sheaves 34, 36 is variable.

In a number of variations the driving pulley assembly 12 and the driven pulley assembly 14 may be engaged through a linking member 54, which may be a belt, chain, cable, band, or other endlessly looping member that extends between and encircles the pulley axles 20 and 38 with loop ends 56 and 58, and that may be engaged between the respective inner surfaces of the driving pulley assembly 12 and the driven pulley assembly 14. Gear ratios between the driving pulley assembly 12 and the driven pulley assembly 14 may be varied by changing one or both of the distances 33, 53 between the respective sheaves, causing the loop end 56 to move toward or away from the pulley axle 38 and/or causing the loop end 58 to move toward or away from the pulley axle 22. The linking member 54 may include a plurality of teeth 60 that may be at equally spaced intervals around the length of the linking member 54. The teeth 60 may be provided at one or more rows, such as rows 62, 64, that may be distributed across the width 68 of the linking member 54. The driving pulley assembly 12 may have one or more rows, such as rows 72 and 74, of teeth 76 disposed in a circular pattern around the pulley axis 38 and on the inner surfaces, such as inner surface 52. The driven pulley assembly 14 may have one or more rows, such as rows 77, 78 of teeth 79 disposed in a circular pattern around the pulley axis 20 and on the inner surfaces, such as inner surface 34. The driving pulley 12 and the driven pulley 14 may frictionally engage the linking element 34 between the respective sheaves 34, 36 and 16, 18 to transfer torque. In addition, positive engagement may be provided when the distance 53 between the sheaves 34, 36 and/or the distance 33 between the sheaves 16, 18 is set so that the teeth 60 of the linking member 34 register with a row of teeth, such as the rows 72, 74, 77, 78. When the teeth 60 mesh with the teeth 76 or 79 positive engagement may provide improved torque transfer between the driving pulley assembly 12 and the driven pulley assembly 14. When the linking element 34 registers with the sheaves 34, 36 or 16, 18, outside the rows 72, 74, 77, 78, torque may be transferred through frictional engagement. The row or rows 72, 74, 77, 78 may be positioned to correspond with select gear ratios between the driving pulley assembly 12 and the driven pulley assembly 14 such as for example, a high torque, low gear ratio.

Figure 2:
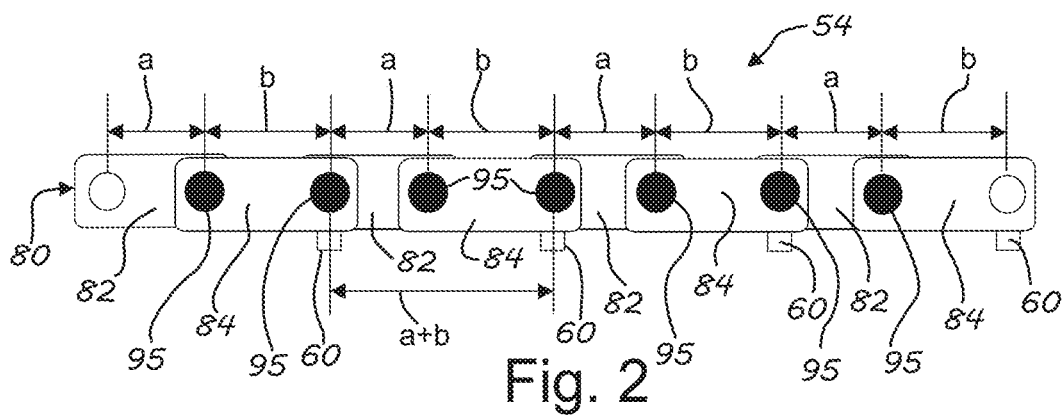
FIG. 2 illustrates a schematic view of a product according to a number of variations.
Figure 3:
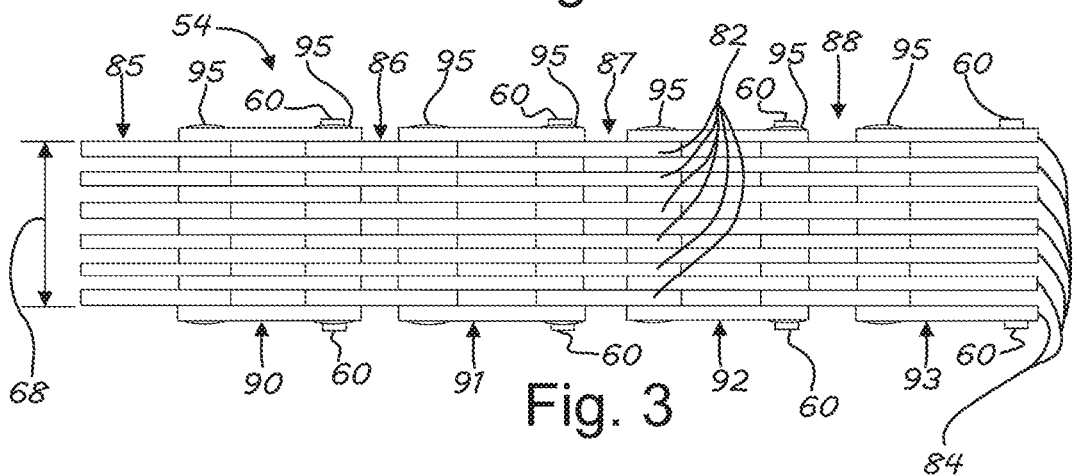
FIG. 3 illustrates a schematic view of a product according to a number of variations.

In a number of variations as illustrated in FIGS. 2 and 3, the linking member 54 may be provided as a number of links connected in a chain 80, a segment of which is shown. The chain 80 may be constructed in a loop and may be comprised of two types of links, short links 82 and long links 84. The short links 82 may be provided in alternate rows (every other row), such as rows 85, 86, 87 and 88. The long links 84 may be provided in alternate rows (every-other row), such as rows 90, 91, 92 and 93. The short links 82 may preferably be in the order of 5-10 millimeters long. The long links 84 may be preferably in the order of 1.3 to 1.5 times the length of the short links 82, or may be at least 1.2 times the length of the short links 82. However, the specific lengths may vary by application. This may result in a chain 80 with two different and specific pitch lengths "a" and "b," with the pitch length "a" provided by the short links 82 and the pitch length "b" provided by the long links 84. In each case a row of short links 82 may be pivotably connected to an adjacent row of long links 84 by a pin 95, to enable looping around the pulley assemblies 12 and 14. The sequence of pitch lengths "a"–"b"–"a"–"b"–"a"–"b" . . . is repeated around the entire length of the chain 80. The chain 80, may include the teeth 60 provided at consistent spacing, which may be a distance equal to "a"+"b" along its entire length. The teeth 60 may be integrally formed with, or connected to individual links, and may extend inwardly toward the pulley axles 20, 38 as shown in FIG. 2, and/or laterally from the side of the chain 80 as shown in FIG. 3. The teeth 60 may be provided in one row along the length of the chain 80, or may be provided in multiple rows along the length of the chain 80. In each case the teeth 60 may register with a pin 95, and may be in line therewith along the length of the chain 80. As a result, the meshing teeth 76, 79 on the pulley assemblies 12, 14, may be provided with a meshing consistent spacing to match the teeth 60. By providing the chain 80 with a multiple number of consistent pitches in a fixed alternating sequence, noise may be reduced through a relatively simple construction.

Figure 4:
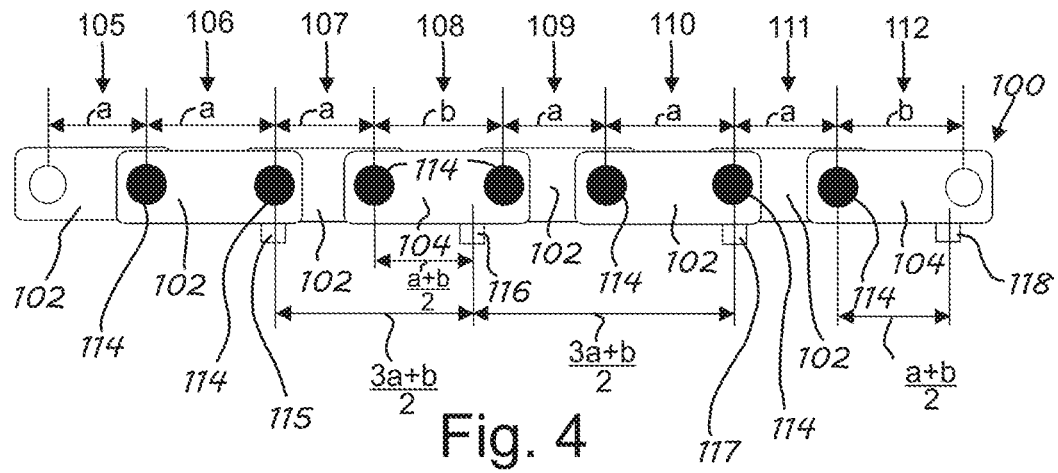
FIG. 4 illustrates a schematic view of a product according to a number of variations.

In a number of variations as illustrated in FIG. 4, the linking member 54 may be provided as a number of links connected in a chain 100, a segment of which is shown. The chain 100 may be constructed in a loop and may be comprised of two types of links, short links 102 and long links 104. The short links 102 may be provided in sets of three adjacent rows, such as rows 105-107 and rows 109-111. The sets of short link rows 105-107 and 109-111 may be separated by one row of long links 104, such as rows 108 and 112. The short links 102 may preferably be in the order of 5-10 millimeters long. The long links 104 may preferably be in the order of 1.3 to 1.5 times the length of the short links 102, or may be at least 1.2 times the length of the short links 102. However, the specific lengths may vary by application. This may result in a chain 100 with two different and specific pitch lengths "a" and "b," with the pitch length "a" provided by the short links 102 and the pitch length "b" provided by the long links 104. In each case a row of short links 102 or long links 104 may be pivotably connected to an adjacent row by a pin 114, to enable looping around the pulley assemblies 12 and 14. The sequence of pitch lengths "a"–"a"–"a"–"b"–"a"–"a"–"a"–"b" . . . is repeated around the entire length of the chain 100. The chain 100, may include teeth, such as the teeth 115-118 provided at consistent spacing, which may be a distance equal to (3"a"+"b")/2, along its entire length. The teeth 115-118 may be integrally formed with, or connected to individual links, and may extend inwardly toward the pulley axles 20, 38 as shown in FIG. 4, and/or laterally from the side of the chain 100, such as shown in FIG. 3. Alternate teeth, such as the teeth 115 and 117 may register with a pin 114, and may be in line therewith along the length of the chain 100. Alternate teeth, such as the teeth 116 and 118 may be located a distance equal to ("a"+"b")/2 from each pin 114 that is located at the joint between the "a"–"a"–"a" rows and the "b" row in the sequence.

Figure 5:
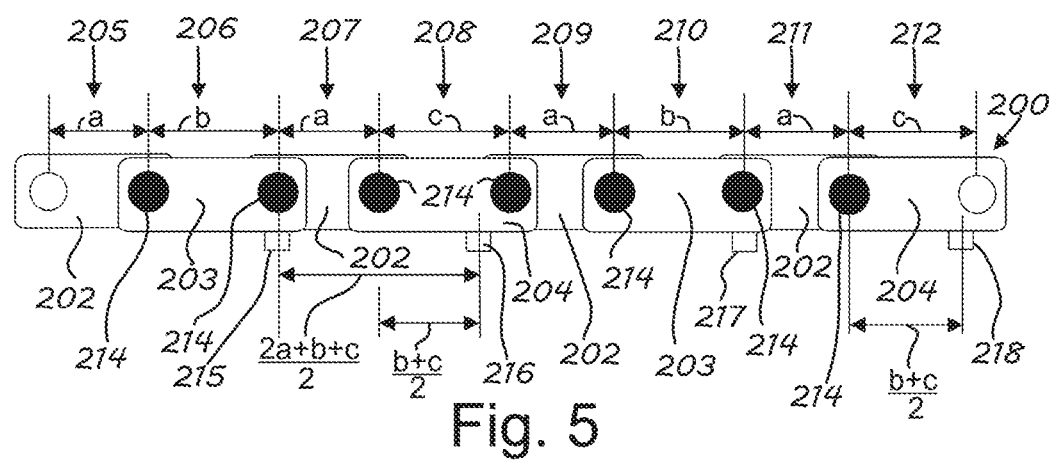
FIG. 5 illustrates a schematic view of a product according to a number of variations.

In a number of variations as illustrated in FIG. 5, the linking member 54 may be provided as a number of links connected in a chain 200, a segment of which is shown. The chain 200 may be constructed in a loop and may be comprised of three types of links, short links 202, medium links 203 and long links 204. The short links 202 may be provided in alternate rows (every-other row), such as rows 205, 207, 209 and 211. The short link rows may be separated alternately, by one row of medium links 203, such as rows 206 and 210, and then one row of long links 204, such as rows 208 and 212. The short links 202 may preferably be in the order of 5-10 millimeters long. The medium links 203 may preferably be in the order of 1.3-1.5 times the length of the short links 202 or may be at least 1.2 times the length of the short links 202. The long links 204 may preferably be in the order of 1.3 to 1.5 times the length of the medium links 203, or may be at least 1.2 times the length of the medium links 203. However, the specific lengths may vary by application. This may result in a chain 200 with three different and specific pitch lengths "a," "b" and "c," with the pitch length "a" provided by the short links 202 and the pitch length "b" provided by the medium links 203, and the pitch length "c" provided by the long links 204. In each case a row of links may be pivotably connected to an adjacent row by a pin 214, to enable looping around the pulley assemblies 12 and 14. The sequence of pitch lengths "a"–"b"–"a"–"c"–"a"–"b"–"a"–"c" . . . is repeated around the entire length of the chain 200. The chain 200, may include teeth, such as the teeth 215-218, provided at consistent spacing, which may be equal to (2"a"+"b"+"c")/2, along its entire length. The teeth 215-218 may be integrally formed with, or connected to individual links, and may extend inwardly toward the pulley axles 20, 38 as shown in FIG. 5, and/or laterally from the side of the chain 200, such as shown in FIG. 3. Alternate teeth, such as the teeth 215 and 217 may register with a pin 214, and may be in line therewith along the length of the chain 200. Alternate teeth, such as the teeth 216 and 218 may be located a distance ("b"+"c")/2 from each pin 214 that is located at the joint between the "a" rows and the "c" rows in the sequence.

Figure 6:
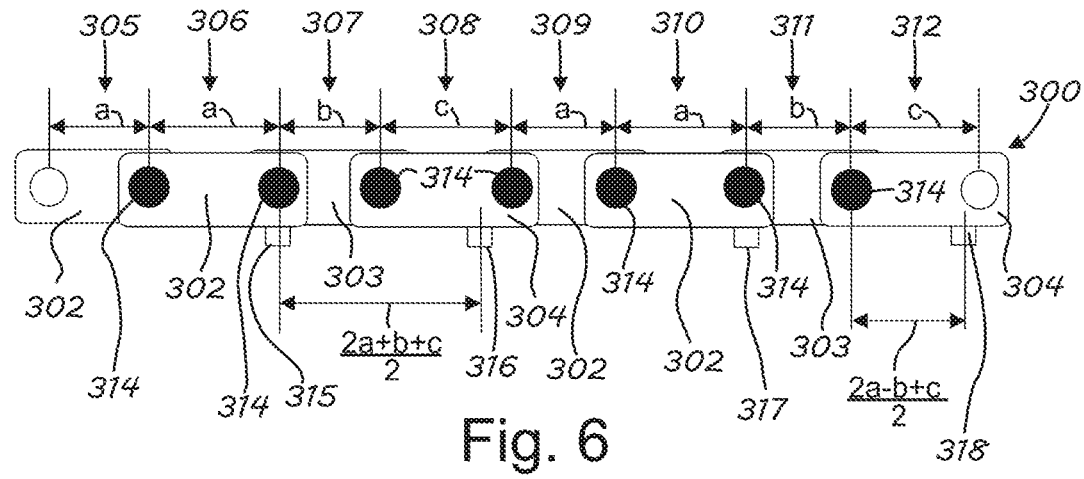
FIG. 6 illustrates a schematic view of a product according to a number of variations.

In a number of variations as illustrated in FIG. 6, the linking member 54 may be provided as a number of links connected in a chain 300, a segment of which is shown. The chain 300 may be constructed in a loop and may be comprised of three types of links, short links 302, medium links 303 and long links 304. The short links 302 may be provided in pairs of two adjacent rows such as rows 305 and 306 and rows 309 and 310. The short link row pairs may be separated alternately, by one row of medium links 303, such as rows 307 and 311, and then one row of long links 304, such as rows 308 and 312. The short links 302 may preferably be in the order of 5-10 millimeters long. The medium links 303 may preferably be in the order of 1.3-1.5 times the length of the short links 302, or may be at least 1.2 times the length of the short links 102. The long links 304 may preferably be in the order of 1.3 to 1.5 times the length of the medium links 303, or may be at least 1.2 times the length of the medium links 303. However, the specific lengths may vary by application. This may result in a chain 300 with three different and specific pitch lengths "a," "b" and "c," with the pitch length "a" provided by the short links 302 and the pitch length "b" provided by the medium links 303, and the pitch length "c" provided by the long links 304. In each case a row of links may be pivotably connected to an adjacent row by a pin 314, to enable looping around the pulley assemblies 12 and 14. The sequence of pitch lengths "a"–"a"–"b"–"c"–"a"–"a"–"b"–"c" . . . is repeated around the entire length of the chain 300. The chain 300, may include teeth, such as teeth 315-318 provided at consistent spacing, which may be (2"a"+"b"+"c")/2, along its entire length. The teeth 315-318 may be integrally formed with, or connected to individual links, and may extend inwardly toward the pulley axles 20, 38 as shown in FIG. 6, and/or laterally from the side of the chain 300, such as shown in FIG. 3. Alternate teeth, such as the teeth 315 and 317 may register with a pin 314, and may be in line therewith along the length of the chain 300. Alternate teeth, such as the teeth 316 and 318 may be located a distance (2"a"–"b"+"c")/2 from each pin 314 that is located at the joint between the "b" rows and the "c" rows in the sequence.

The sequences of multiple pitch lengths disclosed herein constitute preferred embodiments that support efficient assembly and reduced noise, and while described as illustrative variations are not intended to be exhaustive of all possible variations. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product that may include a linking member that may have links arranged in rows that have multiple pitch lengths. Each of the rows may have at least one link. Each of the multiple pitch lengths may be a discrete length that may be different from others of the multiple pitch lengths. The rows may be arranged along the linking member in a repeating sequence of the multiple pitch lengths.

Variation 2 may include a product according to variation 1 wherein the linking member may include teeth extending from the links. The teeth may be disposed at consistently spaced intervals along the linking member.

Variation 3 may include a product according to variation 2 and may include pins that may connect each adjacent row of the links. Some of the teeth may each be aligned with one of the pins along the linking member.

Variation 4 may include a product according to variation 1 or 2 wherein one of the multiple pitch lengths may be at least 1.2 times another of the multiple pitch lengths.

Variation 5 may include a product according to any of variations 1 through 4 and may include a driving pulley assembly and a driven pulley assembly. The linking member may connect the driving pulley assembly with the driven pulley assembly.

Variation 6 may include a product according to variation 5 wherein at least one of the driving pulley assembly or the driven pulley assembly may include a row of teeth that may selectively engage the teeth of the linking member, which may provide positive meshing engagement there-between.

Variation 7 may include a product according to any of variations 1 through 6 wherein the multiple pitch lengths may include one of either two pitch lengths, or three pitch lengths.

Variation 8 may include a product according to variation 7 wherein each of the two pitch lengths and the three pitch lengths may include an "a" pitch length and a "b" pitch length. The "b" pitch length may be at least 1.2 times the "a" pitch length.

Variation 9 may include a product according to variation 8 wherein the three pitch lengths may include a "c" pitch length that is at least 1.2 times the "b" pitch length.

Variation 10 may include a product according to any of variations 1 through 9 wherein the linking member may be a chain wherein each of the rows of the links may be connected to its adjacent rows by a pin.

Variation 11 may include a product according to any of variations 1 through 4 or 7 through 10 and may include a driving pulley assembly that may have a first pair of sheaves. A driven pulley assembly may have a second pair of sheaves. Each of the rows may have multiple links so that the row may extend between and may engage each sheave in the first and second pairs of sheaves.

Variation 12 may include a product that may have a linking member that may transfer torque and may include a number of links that may be arranged in a series of rows. Each row may be pivotable relative to its adjacent rows. Each row in the series of rows may establish a pitch length. The pitch lengths may include a short length and a long length that may be longer than the short length. The short and long lengths may be arranged around the linking member in a repeating sequence.

Variation 13 may include a product according to variation 12 wherein the linking member may include teeth extending from the links. The teeth may be disposed at consistently spaced intervals along the linking member.

Variation 14 may include a product according to variation 13 and may include pins that may connect each adjacent row of the links. Some of the teeth may each be aligned with one of the pins along the linking member.

Variation 15 may include a product according to variation 14 wherein some of the teeth may each not be aligned with any of the pins along the linking member.

Variation 16 may include a product according to variation 13 and may include a driving pulley assembly and a driven pulley assembly wherein the linking member may connect the driving pulley assembly with the driven pulley assembly.

Variation 17 may include a product according to variation 16 wherein at least one of the driving pulley assembly or the driven pulley assembly may include a row of teeth that may selectively engage the teeth of the linking member and may provide positive meshing engagement there-between.

Variation 18 may include a product according to variation 12 and may include a driving pulley assembly that may have a first pair of sheaves and a driven pulley assembly that may have a second pair of sheaves. Each of the rows may have multiple links so that the rows may extend between and may engage each sheave in the first and second pairs of sheaves.

Variation 19 may include a product that may include a driving pulley assembly, and a driven pulley assembly. A chain may engage both the driving pulley assembly and the driven pulley assembly and may transfer torque there-between. The chain may include a number of links that may be arranged in a series of rows. Each row may be pivotable relative to its adjacent rows. Each row in the series of rows may establish a pitch length. The pitch lengths may include a short length and a long length that may be longer than the short length. The short and long lengths may be arranged around the linking member in a repeating sequence.

Variation 20 may include a product according to variation 19 wherein the pitch lengths may include a medium length that may be longer than the short length and may be shorter than the long length. The short, medium and long pitch lengths may be arranged around the linking member in a repeating sequence.

The above description of select variations within the scope of the invention is merely illustrative in nature and, thus, variations or variants thereof are not to be regarded as a departure from the spirit and scope of the invention.

What is claimed is:

1. A product comprising a linking member having links arranged in rows, the rows connected together by pins defining multiple pitch lengths of the linking member, wherein each pitch length in the multiple pitch lengths is defined between an adjacent pair of the pins; and
   a driving pulley assembly and a driven pulley assembly each rotatable on a pulley axle,
   wherein the linking member connects the driving pulley assembly with the driven pulley assembly,
   wherein the linking member includes teeth extending from the links inwardly toward the pulley axles, the teeth disposed at consistently spaced intervals along the linking member, wherein some of the teeth may each be aligned with one of the pins along the linking member,
   wherein each of the rows has at least one link, the rows arranged along the linking member in a repeating sequence of the multiple pitch lengths, wherein each of the multiple pitch lengths is a discrete length that is different from at least some others of the multiple pitch lengths;
   wherein all the links in each respective row are identical, wherein the multiple pitch lengths include at least one of:
   an "a" pitch length and a "b" pitch length, with the teeth separated from one another by a first distance equal to a sum of the "a" pitch length plus the "b" pitch length; or
   the teeth separated from one another by a second distance equal to half of a sum of three of the "a" pitch length plus the "b" pitch length.

2. The product according to claim 1 wherein at least one of the driving pulley assembly or the driven pulley assembly includes a row of teeth that selectively engage the teeth of the linking member providing positive meshing engagement there-between.

3. The product according to claim 1, wherein the multiple pitch lengths include a "c" pitch length.

4. The product according to claim 3 wherein the "b" pitch length is at least 1.2 times the "a" pitch length and the "c" pitch length is at least 1.2 times the "b" pitch length.

5. The product according to claim 4 comprising a first link defining the "a" pitch length, a second link defining the "b" pitch length, and a third link defining the "c" pitch length, wherein the second link is longer than the first link and the third link is longer than the second link, wherein the "c" pitch length is at least 1.2 times the "b" pitch length.

6. The product according to claim 1 wherein the linking member is a chain.

7. The product according to claim 1 wherein the driving pulley assembly has a first pair of sheaves and the driven pulley assembly has a second pair of sheaves and wherein each of the rows has multiple links so that each row extends between and engages each sheave in the first and second pairs of sheaves.

8. A product comprising a linking member that transfers torque and includes a number of links arranged in a series of rows, each row in the series of rows are pivotable relative to its adjacent rows, wherein each row establishes a respective pitch length and wherein the pitch lengths of the linking member include at least two different lengths, wherein the at least two different lengths comprise at least two of a short length, a medium length, and a long length, wherein the medium length is longer than the short length and the long length is longer than the medium length, the at least two of the short, medium and long lengths arranged along the linking member in a repeating sequence, wherein the linking member includes teeth extending from the links, the teeth disposed at consistently spaced intervals along the linking member, wherein the consistently spaced intervals comprise at least one of: a+b, 3α+b/2, and 2α+b+c/2, where "a" is equivalent to the short length, "b" is equivalent to the medium length, and "c" is equivalent to the long length.

9. The product according to claim 8 further comprising a driving pulley assembly and a driven pulley assembly each rotatable on a pulley axle, wherein the linking member connects the driving pulley assembly with the driven pulley assembly, wherein the teeth extend from the links inwardly toward the pulley axles.

10. The product according to claim 9 further comprising pins connecting each adjacent row of the links, wherein at least some of the teeth are each aligned with one of the pins along the linking member.

11. The product according to claim 10 wherein at least some of the teeth are disposed between a pair of the pins along the linking member and part-way along a link connecting the pair.

12. The product according to claim 8 further comprising a driving pulley assembly and a driven pulley assembly wherein the linking member connects the driving pulley assembly with the driven pulley assembly.

13. The product according to claim 12 wherein at least one of the driving pulley assembly or the driven pulley assembly includes a row of teeth that selectively engage the teeth of the linking member providing positive meshing engagement there-between.

14. The product according to claim 8 further comprising a driving pulley assembly and a driven pulley assembly, wherein the driving pulley assembly has a first pair of sheaves and the driven pulley assembly has a second pair of sheaves and wherein each of the rows has multiple links so that the rows extend between and engage each sheave in the first and second pairs of sheaves.

15. A product comprising a driving pulley assembly, a driven pulley assembly each rotatable on a pulley axle, and a chain that engages both the driving pulley assembly and the driven pulley assembly and transfers torque there-between, and includes a number of links arranged in a series of rows, each row in the series of rows pivotable relative to its adjacent rows, wherein each row establishes a respective pitch length and wherein the pitch lengths of the chain include multiple pitch lengths arranged along the chain in a repeating sequence, wherein the links include teeth extending inward toward pulley axles of the driving and driven pulley assemblies, the teeth disposed at consistently spaced intervals along the chain, wherein the multiple pitch lengths comprise an "a" pitch length, a "b" pitch length, and a "c" pitch length, and wherein the teeth are separated from one another by a distance equal to half of a sum of two of the "a" pitch length plus the "b" pitch length plus the "c" pitch length.

16. The product according to claim 15 comprising a first link defining the "a" pitch length, a second link defining the "b" pitch length, and a third link defining the "c" pitch length, wherein the second link is longer than the first link and the third link is longer than the second link, the "a" pitch length, the "b" pitch length, and the "c" pitch length are arranged along the chain in a repeating sequence.

* * * * *